United States Patent Office 3,646,091
Patented Feb. 29, 1972

3,646,091

CYANOALKYL (ORGANOFUNCTIONAL) SILICON COMPOUNDS

Abe Berger, Schenectady, N.Y., assignor to General Electric Company

No Drawing. Continuation-in-part of application Ser. No. 691,928, Dec. 20, 1967. This application July 18, 1969, Ser. No. 843,197

Int. Cl. C07f 7/10; C08g 31/00

U.S. Cl. 260—448.2 N 8 Claims

ABSTRACT OF THE DISCLOSURE

Organofunctional alkyl silicon materials are provided having, in addition, a cyanoalkyl substituent. These compounds are represented by the formula:

(1) QZSiYY' where Q is a cyanoalkyl radical, Z is an organofunctional radical, an unsaturated aliphatic hydrocarbon radical, or a silalkylene group, Y is a halogen, and Y' is Y or a monovalent hydrocarbon radical free of aliphatic unsaturation. These organofunctional-alkyl silanes can be employed as intermediates for making organosilicon polymers.

CROSS-REFERENCE TO RELATED APPLICATIONS

This application is a continuation-in-part of my copending application, Ser. No. 691,928, filed Dec. 20, 1967, and now abandoned, and assigned to the same assignee as the present invention. It is also related to my copending applications, Ser. Nos. 843,213 and 843,214, each filed of even date herewith and assigned to the same assignee as the present invention.

BACKGROUND OF THE INVENTION

Organosilicon compounds substituted with cyanoalkyl radicals are known and have been found useful in a variety of applications. For example, these materials can be employed as intermediates for the production of solvent resistant organosiloxane polymers.

The ability to produce organofunctionally substituted organosilicon materials which include, in addition to a cyanoalkyl radical, a further organofunctional substituent, or an unsaturated aliphatic hydrocarbon group can be of even greater value because of the capability of two functional substituents on the same silicon atom. Sulfone substituted organosilicon materials are also useful as intermediates in the production of solvent resistant organopolysiloxanes, haloalkylsilanes are useful in glass sizings, isocyanate silanes can be employed as fabric stiffeners, and organothiosilanes are useful as metal protectants, in addition to the use of each in the formation of organopolysiloxanes which have similar uses. When these are combined with the cyanoalkyl substituent on a single silicon atom, even greater benefits are realized.

SUMMARY OF THE INVENTION

The present invention relates to organosilanes having both a cyanoalkyl substituent and an organofunctional, monovalent unsaturated aliphatic hydrocarbon radical or silalkylene group having the formula:

(1) QZSiYY' where Q is a cyanoalkyl radical; Z is selected from the class consisting of organofunctional substituents, monovalent unsaturated aliphatic hydrocarbon radicals, and silalkylene groups substituted with a functional group; Y is a halide radical; Y' is selected from the class consisting of Y and monovalent hydrocarbon radicals free of aliphatic unsaturation.

Included among the organosilicon compounds defined by Formula 1 are:

(2) QQ'SiYY'
(3) QR''SiYY'
(4) $YY'_cQ''_{2-c}SiR'''SiQYY'$ where Q, Y and Y' are as previously defined; Q' is an organofunctional radical selected from the group consisting of alkoxyalkyl, fluoroalkoxyalkyl, isocyanatoalkyl, organothioalkyl,

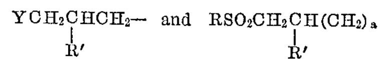

R' is selected from the class consisting of hydrogen and lower alkyl radicals having from 1 to 4 carbon atoms; R'' is an aliphatically unsaturated monovalent hydrocarbon radical; R''' is a divalent saturated aliphatic hydrocarbon radical; *a* is an integer of from 1 to 5; and *c* is an integer of from 1 to 2.

The materials of Formula 4 can be formed by the addition of the hydrogen atom of an SiH group across the double bond of the vinyl substituent of a $SiCH{=}CH_2$ group, or other monovalent aliphatically unsaturated hydrocarbon substituent bonded to a silicon atom. The cyanoethyl substituent can be bonded to either the silicon atom having the hydrogen substituent or to the silicon atom having the monovalent, aliphatically unsaturated substituent and, of course, the group represented by Z can be bonded to either type of silicon atom.

The materials of Formula 1 are useful in solvent resistant organopolysiloxanes, particularly so when the organofunctional substituent represented by Z is a sulfone substituent. Additionally, when the organofunctional substituent other than the cyanoalkyl group is a haloalkyl substituent, the material is useful as a glass sizing. Cyanoalkyl substituted organosilicon materials of Formula 1 having, in addition, an isocyanato group can be employed as fabric stiffeners, while when the additional substituent is an organothio group, the material is useful as a metal protectant. Each of the compounds is useful for production of an organopolysiloxane having several uses.

DESCRIPTION OF THE PREFERRED EMBODIMENTS

The compounds of the present invention are defined by the formula:

(1) QZSiYY' where Q is a cyanoalkyl radical; Z is selected from the class consisting of organofunctional groups, monovalent aliphatically unsaturated hydrocarbon groups, and silalkylene groups having reactive members bonded to the silicon; Y is a halide radical; and Y' is selected from the class consisting of halide and monovalent hydrocarbon radicals free of aliphatic unsaturation. The cyanoalkyl radical has the formula:

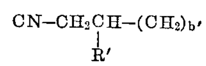

Within the compounds defined by Formula 1, are those having the formulas:

(2) QQ'SiYY' where Q, Y and Y' are as previously defined and Q' is an organofunctional group selected from the class consisting of alkoxyalkyl, fluoroalkoxyalkyl isocyanatoalkyl, organothioalkyl,

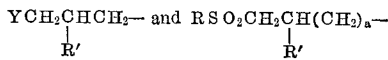

In the above formulas R is a monovalent hydrocarbon radical free of aliphatic unsaturation and R' is selected from the class consisting of hydrogen and lower alkyl groups having from 1 to 4 carbon atoms, $a$ is an integer of from 1 to 5, and $b$ is an integer or 0.

Also included within the compounds of Formula 1 are those compounds having the formula:

$$QR''SiYY' \tag{3}$$

where Q, Y and Y' are as previously defined and R'' is a monovalent aliphatically unsaturated hydrocarbon radical. Included within the compounds defined by Formula 3 are such materials as:

$$CH_2{=}CHSi(Cl_2)CH_2CH_2CN$$
$$CH_2{=}CHCH_2Si(Cl_2)CH_2CH_2CN$$
$$CH_2{=}CHSi(CH_3)(Cl)[(CH_2)_3CN]$$

etc.

Other materials defined by Formula 1 include bis(silalkylene) compounds of formula:

$$YY'_cQ''_{2-c}SiR'''SiQYY' \tag{4}$$

where Q, Y, Y' and $c$ are as previously defined, R''' is a divalent saturated aliphatic hydrocarbon radical, and Q'' is selected from the class consisting of Q, Q' and R''. Included among the compounds represented by Formula 4 are:

$$CNCH_2CH_2(CH_3)(Cl)SiCH_2CH_2Si(Cl_2)CH_2CH(CH_3)CH_2SO_2CH_3$$
$$[CN(CH_2)_3](CH_3)(Cl)Si(CH_2)_3Si(Cl_2)[(CH_2)_3NCO]$$
$$CNCH_2CH_2(Cl_2)Si(CH_2)_2SiCl_3$$

etc.

Groups included by R in the above formulas are, for example, aryl radicals, such as, phenyl, tolyl, xylyl, naphthyl, etc.; alkyl radicals, such as, methyl, ethyl, propyl, butyl, pentyl, etc.; cycloalkyl radicals, such as, cyclopentyl, cyclohexyl, cycloheptyl, etc. Radicals included in those defined by R' are, for example, hydrogen, methyl, ethyl, propyl, butyl. Radicals included within R'' are, for example, vinyl, allyl, 1-propenyl, 2-butenyl, 1-pentenyl, etc. The groups represented by Y' in the above formulas include, in addition to Y, those set forth for R.

The compounds of the present invention are formed through the addition of the hydrogen atom of a SiH group across the double bond of an aliphatically unsaturated hydrocarbon group. The aliphatically unsaturated hydrocarbon group, such as the vinyl group, can be bonded to a silicon, so that the resulting compound is a bis(silalkylene) of Formula 4, or the aliphatically unsaturated hydrocarbon group can be bonded to a further organofunctional group, such as the cyanoalkyl or alkylsulfone group. Preparation of many of the organofunctional silicon hydrides is taught in my U.S. Pat. 3,465,019, filed Dec. 20, 1967, and assigned to the same assignee as the present invention.

The addition reactions for formation of the compounds of the present invention involve the use of hydrosilylation catalysts as shown, for example, in Bluestein U.S. Pats. Nos. 2,971,970; 2,971,971; and 2,971,972, and in Lamoreaux U.S. Pat. No. 3,220,972, all assigned to the same assignee as the present invention.

In order that those skilled in the art may be better enabled to practice the present invention, the following examples are given by way of illustration, and not by way of limitation. All parts, except as otherwise indicated, are by weight.

EXAMPLE 1

A mixture consisting of 161 parts of vinyltrichlorosilane, 22 parts of hexylsilane, and 10 parts of tributylamine was heated under pressure at 130° C. for 5 hours. The mixture was then fractionally distilled and the product boiling at 73° C. was collected. This product had the formula:

$$CH_2{=}CHSiHCl_2$$

A mixture of 31.8 parts of this vinyldichlorosilane, 3 parts of cuprous chloride, 2 parts of N,N,N',N'-tetramethylethylene diamine, 5 parts of tri-n-butylamine, and 15.9 parts of acrylonitrile was refluxed for 5 hours at a temperature of from 68° C. to 71° C. During reflux, the temperature of the mixture rose to 110° C. Anhydrous hydrogen chloride was introduced into the mixture, followed by an amount of hexane equal to the volume of the mixture. The organic layer was separated and fractionated. An 80% yield of product was collected at a boiling point between 79° C. and 80° C. at 6 mm. pressure. Based upon the method of preparation, the product was cyanoethylvinyldichlorosilane of formula:

$$CH_2{=}CHSi(Cl_2)CH_2CH_2CN \tag{5}$$

The structure of the product was substantiated by its infrared spectrum.

EXAMPLE 2

To a mixture of 9 parts of cyanoethylvinyldichlorosilane and 25.6 parts of platinum, per million parts of the silane, was added under an inert atmosphere, 7 parts of trichlorosilane. The platinum catalyst was in the form of chloroplatinic acid. An exothermic reaction resulted, with the temperature of the reaction mixture rising to 135° C. Holding the temperature of the reaction mixture between 120° C. and 140° C., additional trichlorosilane was added. Following the addition, the mixture was heated for 2 additional hours at 120° C. The reaction mixture was then fractionally distilled and an 85% yield of product boiling at 95°–97° C. at $5\times10^{-2}$ mm. was collected. Based upon the method of preparation, the product was cyanoethylpentachlorodisilylethane of formula:

$$Cl_3SiC_2H_4Si(Cl_2)C_2H_4CN \tag{6}$$

The structure of the product was substantiated by its infrared spectrum.

EXAMPLE 3

A mixture of 2 moles of chloropropyltrichlorosilane, 1 mole of hexylsilane, and 7 mole percent, based upon the reaction mixture, of tributylamine, was heated at 130° C. for a period of 3 hours. The mixture was fractionated and the product boiling at 42°–46° C. at 60 mm. was collected. This product had the structure:

$$ClCH_2CH_2CH_2SiHCl_2$$

To a mixture consisting of 6.7 parts of allylcyanide and 120 parts of platinum, per million parts of the allylcyanide, under a nitrogen atmosphere, was added 7.7 parts of gamma-chloropropyldichlorosilane. The platinum was in the form of chloroplatinic acid. Following the addition, the temperature of the reaction mixture was maintained at 110° C. for 4 hours. The mixture was then fractionated and the product boiling at 140° C.–142° C. at 0.25 mm. was collected. Based upon the method of preparation, the product was gamma-chloropropyl, gamma-cyanopropyldichlorosilane of formula:

$$ClCH_2CH_2CH_2Si(Cl_2)CH_2CH_2CH_2CN \tag{7}$$

This represented a 70% yield of the product, based upon the theoretical from the gamma-chloropropyldichlorosilane. The structure of the product was substantiated by its infrared spectrum.

EXAMPLE 4

A quantity of 62 parts of cyanoethyldichlorosilane was added to a mixture of 24 parts of allylmethylsulfone and 48.6 parts of platinum, per million, based upon the total of the reaction mixture. The platinum was in the form of chloroplatinic acid. During the addition, the reaction temperature was maintained at 100°–120° C. Following a reaction period of 2 hours, the mixture was fractionally distilled, and the product boiling at 200° C. at 0.25 mm. was collected. Based upon its method of preparation, the product was beta-cyanoethylmethylsulfonylpropyldichlorosilane of formula:

$$CNCH_2CH_2Si(Cl_2)CH_2CH_2CH_2SO_2CH_3 \tag{8}$$

The structure of the product was substantiated by its infrared spectrum.

Thus, a representative number of organosilicon materials having, not only, a cyanoalkyl substituent, but, in addition, an organofunctional, aliphatically unsaturated hydrocarbon, or functional silalkylene group have been shown. These materials are generically defined by the Formulas 1, 2, 3 and 4.

What I claim as new and desire to secure by Letters Patent of the United States is:

1. An organofunctional-silicon material selected from the class consisting of:

QQ'SiYY'
QR''SiYY'
$YY'_cQ''_{2-c}SiR'''SiQYY'$ where Q is a cyanoalkyl radical; Q' is selected from the class consisting of alkoxyalkyl, fluoroalkoxyalkyl, isocyanatoalkyl, organothioalkyl,

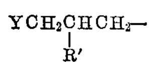

and

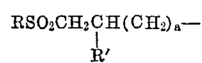

R'' is a monovalent, aliphtically unsaturated hydrocarbon radical; Y is a halide group; Y' is selected from the class consisting of Y and monovalent hydrocarbon radicals free of aliphatic unsaturation; Q'' is selected from the class consisting of Q' and R''; R is a monovalent hydrocarbon radical free of aliphatic unsaturation; R' is selected from the class consisting of hydrogen and lower alkyl radicals of from 1 to 4 carbon atoms; R'' is an aliphatically unsaturated monovalent hydrocarbon radical; R''' is a divalent saturated aliphatic hydrocarbon radical; *a* is an integer of from 1 to 5; and *c* is an integer of from 1 to 2.

2. The organofunctional-silicon material of claim 1 having the formula:

QQ'SiYY'

3. The organofunctional-silicon material of claim 2 having the formula:

$ClCH_2CH_2CH_2Si(Cl_2)CH_2CH_2CH_2CN$

4. The organofunctional-silicon material of claim 2 having the formula:

$CNCH_2CH_2Si(Cl_2)CH_2CH_2CH_2SO_2CH_3$

5. The organofunctional-silicon material of claim 1 having the formula:

QR''SiYY'

6. The organofunctional-silicon material of claim 5 having the formula:

$CH_2{=}CHSi(Cl_2)CH_2CH_2CN$

7. The organofunctional-silicon material of claim 1 having the formula:

$YY'_cQ''_{2-c}SiR'''SiQYY'$

8. The organofunctional-silicon material of claim 7 having the formula:

$Cl_3SiC_2H_4Si(Cl_2)C_2H_4CN$

References Cited

UNITED STATES PATENTS

| | | | |
|---|---|---|---|
| 3,168,544 | 2/1965 | Jex | 260—448.2 |
| 3,185,719 | 5/1965 | Prober | 260—448.2 |

TOBIAS E. LEVOW, Primary Examiner

W. F. W. BELLAMY, Assistant Examiner

U.S. Cl. X.R.

260—46.5 E